May 12, 1964 N. H. EDSTRÖM ETAL 3,133,158

VOICE FREQUENCY SIGNAL RECEIVER

Filed June 28, 1960

2 Sheets-Sheet 1

INVENTORS
NILS HERBERT EDSTRÖM
CARL-ERIC WILHELM HÄRLIN
ALF EDGAR SÖDERLUND
BY Hane and Nydick
ATTORNEYS INVENTORS
NILS HERBERT EDSTRÖM
CARL-ERIC WILHELM HÄRLIN
ALF EDGAR SÖDERLUND
BY Hane and Nydick
ATTORNEYS United States Patent Office 3,133,158

Patented May 12, 1964

3,133,158

VOICE FREQUENCY SIGNAL RECEIVER

Nils Herbert Edström and Carl-Eric Wilhelm Härlin, Hagersten, and Alf Edgar Söderlund, Trangsund, Sweden, assignors to Telefonaktiebolaget L M Ericsson, Stockholm, Sweden, a corporation of Sweden Filed June 28, 1960, Ser. No. 39,338
Claims priority, application Sweden June 9, 1960
1 Claim. (Cl. 179—84)

Figure 1:
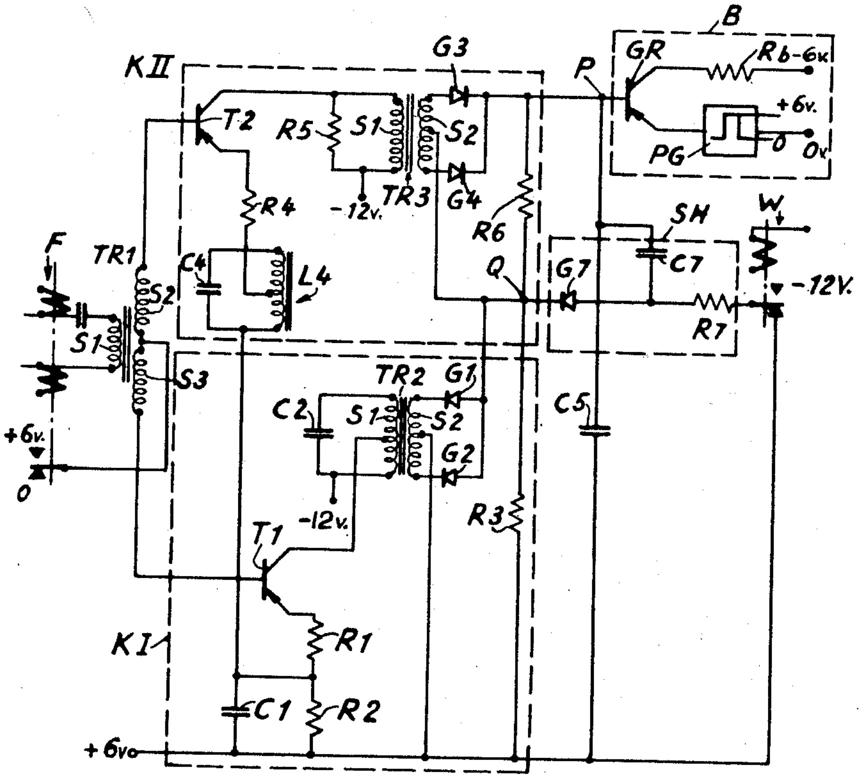

The present invention refers to a voice frequency receiver, particularly to a register-receiver in a telephone system, in which the digit sending from a telephone instrument or from another register is carried out by means of voice frequency oscillators. In usual receivers of said type, the signals are amplified in an amplifier which comprises an oscillating circuit tuned to the signal intended, and the signals obtained are rectified in order to affect, by means of the direct voltage obtained, a load, for example a transistor switch, magnet core or similar, as a sign that the voice frequency signal intended has been received.

In receivers of said type there is a danger that contact vibrations in the key set of the subscriber's instrument cause interruption of the digit signal so that the signal is received as two or more signals. This can be prevented by building the receiver with a relatively great time constant, for example of the order of magnitude of 10–30 ms. It is also possible to use a relay repeating the signal at the output of the receiver and being slow in release, or an RC-circuit which maintains the output signal for a sufficiently long time on a level necessary for bridging-over the interval between short signal interruptions. The time constant of the receiver must be adjusted however also to the time during which a signal ceases in different signalling systems as it is unfavourable that upon rapid signalling, for example from a register to another register, the same great time constant which is necessary for bridging-over current interruptions, prevents the beginning of a new signal. Upon digit sending from a subscriber it is possible on the other hand to maintain the great time constant after the ceasing of the signal, as the subscriber cannot send the next signal so rapidly.

The present invention has the purpose of shortening the time constant of the voice frequency receiver after the ceasing of the signal. This can be carried out independently of the used signalling system, or alternatively only if the rapidity of the signalling system necessitates such a shortening.

The circuit arrangement according to the invention is mainly characterized by the fact that it comprises a shunt-circuit connected to the output of the voice frequency receiver through a rectifier element, the potential at one of the terminals of said rectifier element being defined by the rectified signal voltage in such manner that said rectifier element during the receiving of the signal is almost entirely blocked while the other terminal is through a capacitor connected to a control circuit which comprises an oscillator circuit tuned to the signalling frequency, in order to produce upon the ceasing of the signal a potential peak caused by the dying-out process and consequently to cause such a momentary increasing of the potential through the capacitor at said other terminal of the rectifier element that the conductivity of the rectifier element momentarily increases, causing an increased current in said shunt-circuit and consequently increased damping.

Figure 3:
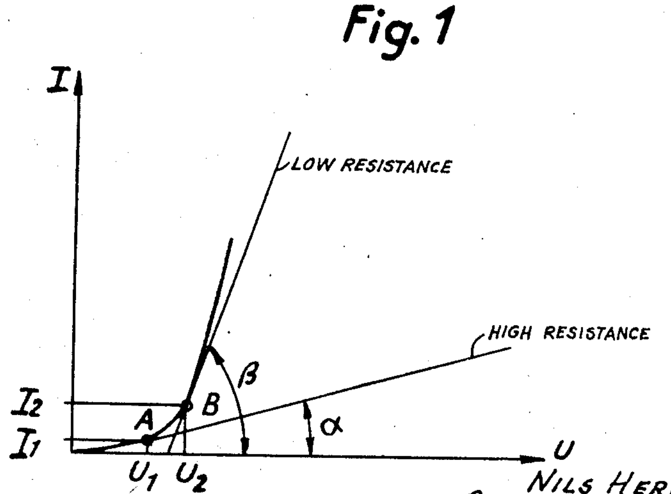

The invention will be explained more in detail by means of an embodiment with reference to the enclosed drawing. FIG. 1 shows a circuit diagram for a voice frequency receiver according to the invention has been applied. FIGS. 2*a*–2*f* show potential and current graphs for explaining the principle of the invention. FIG. 3 shows the characteristic curve of a rectifier included in the circuit arrangement according to the invention.

FIG. 1 shows a voice frequency signal receiver of special type preventing the receiver to be influenced by speech and other disturbing sounds including the voice frequency intended. It should be pointed out however that the invention is not limited to said type of receiver and the only important condition for the function of the device is that the voice frequency receiver includes means responsive to the ceasing of the signal as will be explained. The input transformer TR1 of the voice frequency receiver has two secondary windings S2 and S3 which are connected to their respective parts in the receiver: the signal channel K1 for amplifying and rectifying the voice frequency signal intended and the rejector channel K11 for amplifying and rectifying the voice frequency signals lying outside of the frequency intended. The signal amplifier part comprises a transistor T1, the base of which is connected to the secondary winding S3 of the input transformer and the emitter of which is through resistances R1 and R2 connected to a potential source, for example +6 v. The collector of the transistor T1 is connected to a circuit tuned to the signal frequency in question and consisting of the primary winding S1 of a transformer TR2 and of a capacitor C2. The connection of the emitter to said circuit is carried out through a suitable terminal of the transformer winding S1 between the two terminals of the winding. The connecting point of the capacitor C2 and the winding S1 are connected to a potential source which has lower potential than the potential value to which the emitter of the transistor T1 is connected, for example −12 v. The secondary winding S2 of the transformer is at both terminals connected to a rectifier element G1 and G2 respectively, the other terminals of which are connected with each other and connected to a resistance R3 which at its other terminal is connected to the same potential source as the emitter of the transistor T1. Also the centre of the secondary winding of the transformer TR2 is connected to said potential source.

The rejector part K11 comprises a transistor T2, the base of which is connected to the other secondary winding S2 of the input transformer TR1 and the emitter circuit of which includes a circuit C4, L4 tuned to the oscillation frequency, the connection of the emitter to said circuit being carried out by a suitable tap on the winding L4, which tap is selected in view of the required selectivity and degree of feed-back. The circuit C4, L4 is furthermore connected to the same potential source as the centre point of the secondary winding of the transformer TR2, for instance +6 volts, through the resistance R2, with which the capacitor C1 is connected in parallel. The collector of the transistor T2 is connected to one terminal of the primary winding S1 of a transformer TR3, which winding is connected in parallel with a resistance R5 and at its other terminal is connected to the lower potential source, for instance to −12 v. The secondary winding of the transformer TR3 has its terminals connected to rectifier means G3, G4 in the same way as the secondary winding of the transformer TR2 has to G1, G2, with the difference that the means G3, G4 are directed opposite relatively to the means G1, G2 and connected at their terminals remote from the transformer windings and are connected to the resistance R3 through a resistance R6. The connection point of resistances R6 and R3 is also connected to the secondary winding of the transformer TR3. A capacitor C5 is connected in parallel with the resistances R6 and R3 connected in series. The centre point of the secondary winding of the transformer TR1 is in inactive condition of the receiver connected to 0-potential. In this way the potential at the bases of the transistors T1 and T2 will have such a value that the transistors are maintained blocked. Upon a call when the receiver is occupied, the potential of the bases will be changed from 0 to +6 v. This is symbolized by a current feeding relay F operating when the loop is closed. The potential change causes that the transistors occupy the required working point. Hereby a minimum loss is caused in resting condition.

When no voice frequency signals reaching to the receiver, there is no potential across the capacitor C5. If on the other hand the voice frequency signal intended is received, a selective amplifying of this signal is obtained through the transistor T1 and the transformer TR2, the output signal being rectified and appearing across the resistance R3. If the signal is obtained from a disturbing source which also includes other frequencies besides the frequency intended, said frequencies are amplified in the amplifier T2, TR3 of the protecting part besides the frequency, for which the receiver is built, as the series resonance circuit C4, L4 is inserted into the emitter circuit of the transistor T2, so that the rejection channel will have a great impedance for this frequency. The amplified and rectified signals appear in the form of a direct potential across the resistance R6, which direct potential is directed opposite to the potential obtained across the resistance R3. By suitable adjustment of the amplification of the two receiver parts can be attained that, if the signal originates from a disturbing source, the difference potential obtained across the resistances R6, R3 will be too low for influencing a load while upon receiving of the right signal, the potential across the resistance R3 will predominate so that the load can be affected. It is easy to understand that upon receiving the signal intended for the receiver, when there is no disturbing source, only the signal channel will be influenced except at the beginning and the end of the signal when also a direct potential signal appears across the resistance R6. This depends on the fact that the circuit C4, L4 has a certain building-up and dying-out time respectively and it will not block immediately for the signal frequency when receiving the same, but it continues to oscillate after the ceasing of the signal frequency so that also in this case a certain rectified potential will appear across the resistance R6. The device hereabove described is well known before.

As mentioned before the problem consists however therein that the circuit C2, S1 in the signal receiving part has a definite time constant allowing that momentary interruptions in the signalling do not appear as separate signals, and it does not prevent the beginning of a new signal in such signalling systems in which the signal sending is carried out relatively slowly, for example from a receiver to the register. However, such said time constant is an obstacle if the signalling is carried out rapidly, for example between two registers, in which case it is consequently advantageous to have a shorter time constant. The invention solves the problem of working with a long time constant during the signal reception itself so as to eliminate fault possibilities owing to momentary interruptions, and also to maintain or shorten respectively the time constant correspondingly to the rapidity of the used signalling system.

Figures 2A, 2B, 2C, 2D, 2E, 2F:
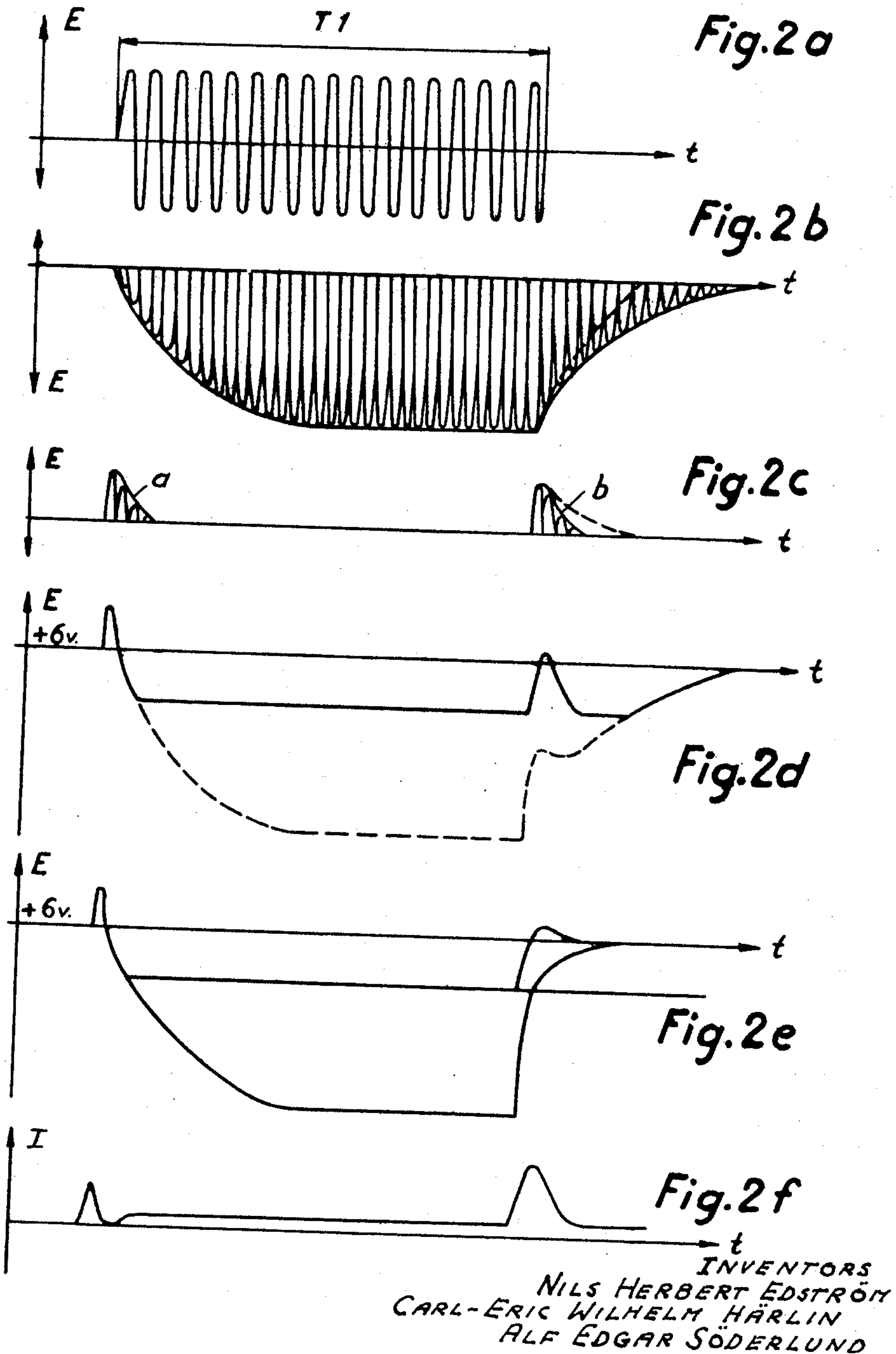

The diagrams in FIGS. 2*a*–2*f* show different potential and current graphs in order to explain the principle of the invvention. FIG. 2*a* shows an incoming voice frequency signal having $T_1$-duration. FIG. 2*b* shows the direct potential obtained after the rectification of the signal and appearing in the connecting point Q of the resistances R3 and R6. As is easy to understand, the shape of the curve is defined at the beginning and the end by the building-up and the dying-out process respectively of the circuit C2, S1, i.e. the time constant of the circuit. FIG. 2*c* shows the graph for the direct potential arising by rectification of the signal passing through the rejection channel at the beginning of the signal (*a*), when the oscillating circuit does not block completely for the signalling frequency, and at the end of the signal (*b*), when the circuit L4, C4 continues the oscillation a certain time dependingly on its time constant. Said potential appears across the resistance R6 and the sum of the two rectified signal potentials produce the potential in point P, which for example is connected to the base of a transistor gate GR connected to a load circuit B. In dependence on the value of the rectified signal voltage, that is dependingly on the existence of a signal, the gate GR will let pass pulses from a pulse generator to a load R*b*. According to the exemplification of the invention it is supposed that the emitter of the gate transistor is through the pulse generator connected to 0-potential and its collector is through the load connected to −6 v. while its base has +6 v.-potential in resting condition. The amplitude of the pulses is +6 v. but as long as the potential of the base is not decreased there can pass no pulse through the gate.

FIG. 2*d* shows the variation of the potential on the base of the gate, that is, in the point P, without the circuitry according to the present invention. Before the signal is received, the potential in said point is the same as at the other terminal of the capacitor C5, i.e. +6 v. Owing to the superposition of the two rectified potentials the potential will increase further during the building-up time of the circuit C4, L4 but after a certain time the rectified potential of the signal appearing across the resistance R3 will predominate and the original potential of +6 v. will decrease to for example +2.5 v., so that the gate GR is not blocked for the pulses having a peak value of +6 v. The potential in the point P is however influenced by the pulses which cause a displacement of the base potential from the value of +2.5 v. indicated by dashed lines, to the value indicated by full lines, for example +5.5 v.

As indicated in the diagram the time constant of the oscillating circuit C2, S2 is high depending on the fact that the capacitor C5 is discharged very slowly as its energy is only used during the pulses and not during the pulse intervals. The high time constant prevents that interruptions in the signal sending to appear at by the receiver as separate signals. When the signal ceases (but also in the case of unvoluntary interruptions), said before mentioned momentary increase of potential arises across the resistance R6 owing to the dying-out process (*b* in the curve 2*c*), in consequence of which the potential in the point P increases temporarily. After this, the potential takes again the value defined by the potential obtained in the signal channel by rectification, which potential similarly will decrease but owing to the fact that the time constant of the signal circuit is higher than that of the rejection channel, the potential value returns at first to +5.5 v. before it is increased to a value at which the transistor is blocked as it is easy to understand from FIG. 2*d*.

Said potential process can be used according to the invention for decreasing the long dying-out time according to FIG. 2*d* by means of a shunt-circuit SH (FIG. 1). Said shunt-circuit comprises a rectifier G7, a resistance R7 connected to the blocking side of said rectifier and a capacitor C7 connected to the connection point of the rectifier and of the resistance. The passing side of the rectifier is connected to the connection point of the resistances R3 and R6, the other terminal of the capacitor being connected to the base of the gate and the other terminal of the resistance being connected to the potential source +6 v. During the receiving of the signal the potential value of about +5.5 v. indicated in FIG. 2*d* is prevailing at the passing side of the rectifier, so that a very small current can pass through the rectifier. FIG. 3 shows the voltage-current characteristic of the rectifier. As is well known, the characteristic curve of a rectifier is non-linear; that is, a small increase of the voltage causes a large increase of the current value. The working point of the rectifier is shown at A, corresponding to voltage $U_1$ and current $I_1$. The resistance at that point is represented by the tangent marked "High Resistance." An increasing of the potential in point P corresponding to the potential peak *b* in the diagram 2*c* will cause a momentary increase of the potential in point P. Said increasing of the potential is conducted through the capacitor C7 to the blocking side of the rectifier G7, in consequence of which the working point of the rectifier is momentarily displaced to B, so that a greater current can pass through the circuit G7, R7 connected to the two terminals of the resistance R3. As it appears from FIG. 3, the curve of the characteristic in point A which has a potential value $U_1$ and a current value $I_1$, has a tangent defining a high resistance whereas in point B which has a potential value $U_2$ and a current value $I_2$, the characteristic curve has a tangent representing a low resistance value. Consequently the damping of the circuit C2, S1 increases correspondingly to the dashed line in FIG. 2*b* and the potential in the point P obtains the value indicated in FIG. 2*e*. Capacitor C5 defines the time constant of circuit C2, S1. This circuit, together with resistance R3, R6 forms an RC circuit for smoothing the signal obtained from the rectifier G1 and G2. The time constant defines the shape of the envelope in FIG. 2*b*. When the signal ceases, the time constant should be shortened and such shortening is effected by increasing the discharge rate of capacitor C5. The increase of the discharge rate occurs when the potential in point P exceeds the value of 6 v., whereupon a current flows from capacitor C5 and capacitor C7 through rectifier G7, resistance R3 and in shunt through rectifiers G1 and G2. As a result a low resistance shunt circuit is obtained through which the source or potential formed by capacitors C5 and C7 connected in series is discharged at an increased rate. The momentary potential at connecting point of capacitor C7 and resistance R7 does not depend on the potential supplied to resistance R7 due to the high impedance of the resistance. Owing to the fact that the capacitor C7 has been momentarily charged, simultaneously the damping of the parallel resonance circuit C4, L4 will decrease, so that the potential across the resistance R6 obtains the value indicated in FIG. 2*c* by dashed lines. The circuits in the arrangements are dimensioned in such manner that the time constants according to 2*b* and 2*c* will be equal. The resulting potential process in point P is indicated in FIG. 2*e* in which in the same manner as in the diagram 2*b* the lower curve shows the condition in the absence of gate pulses and the upper curve in the presence of gate pulses. As it appears from FIG. 2*e* the base of the gate will be blocked much earlier due to the decrease of the time constant in the signal circuit than without the shunt-circuit according to the invention. It appears also by a comparison between FIGS. 2*d* and 2*e* that when applying the invention on a voice frequency receiver, in which sound imitation is eliminated, the danger will be eliminated that the end of the signal will appear as a new signal as may be possible if the potential graph corresponds to FIG. 2*d*.

FIG. 2*f* shows the approximative value of current passing through the rectifier G7 in correspondance to the potential variations. As it appears the rectifier is completely blocked before the receiving of the signal, as the potential at its both terminals is +6 v. Corresponding to the first peak in FIG. 2*e*, where the potential in the point P increases somewhat, for example to +7 v., a current peak occurs which disappears, whereupon only a weak current will pass through the rectifier, corresponding to the small potential difference between its two terminals (6 v.—5.5 v.). Upon ceasing of the signal voltage a peak occurs however owing to the fact that the potential across the terminals of the rectifier increases (7 v.—5.5 v.). The curve is of course only diagrammatical in order to show the principle.

As mentioned before it is of no practical importance to decrease the time constant when receiving the voice frequency signals from subscriber's instruments as the time passing between two digit signals is in every case longer than the time constant of the voice frequency receiver. In the case the same receiver should be used for signalling systems of different rapidities it is possible to arrange a switch, in FIG. 1 symbolized for the sake of simplicity by a relay W which is operated only if the call implies the use of a rapid signalling system. In said case the relay W connects the shunt-circuit to −12 v. instead of +6 v., so that the increase of the potential caused by the voltage impulse is not sufficient to open the rectifier of the shunt-circuit.

As pointed out before the invention is in no way limited to the use of a voice signal receiver having a blocking channel for eliminating sound imitations, but any suitable circuit may be used which upon the ceasing of the signal by its dying-out process causes a potential peak.

We claim:

A voice frequency signal receiver for varying the time elapsing between the ceasing of a voice frequency signal of definite frequency supplied to the input of said voice signal receiver and the ceasing of an output signal obtained from the output of the receiver and responsive to said voice frequency signal, said voice frequency receiver comprising at least one amplifier including a first oscillating circuit tuned to the frequency of said signal to be received and rectifying means for rectifying a signal obtained from said oscillating circuit so as to control a load by means of a direct potential responsive to the signal, a shunt circuit connected across the output of said receiver, said shunt circuit including a rectifying element having a non-linear voltage-current characteristic showing a great increase of current in response to a relatively small increase of voltage and having a potential connected across it causing a relatively small current value, a control circuit connected to the input of said voice frequency receiver and including a second oscillating circuit tuned to said signal frequency for preventing passing of signal potential to its output, said control circuit blocking said signal frequency except during a build-up and decay period, respectively, the terminal on the anode side of said rectifying element being connected to the output of said control circuit, a capacitor being connected in series between said terminal and said output so as to obtain a potential peak causing a large increase of current through said rectifier during the decay period.

References Cited in the file of this patent

UNITED STATES PATENTS

| | | |
|---|---|---|
| 2,794,860 | Scholten et al. | June 4, 1957 |
| 2,883,473 | McDermott | Apr. 21, 1959 |
| 2,883,474 | Fritschi | Apr. 21, 1959 |
| 2,923,778 | Dallemagne | Feb. 2, 1960 |
| 2,935,572 | Hastings et al. | May 3, 1960 |
| 2,938,081 | Ronault | May 24, 1960 |